(12) United States Patent
Comment

(10) Patent No.: US 6,477,634 B1
(45) Date of Patent: Nov. 5, 2002

(54) PHYSICAL PAGES DE-ALLOCATION METHOD FOR VIRTUAL ADDRESSING MACHINE

(75) Inventor: Alain Comment, Echirolles (FR)

(73) Assignee: Bull S.A., Louveciennes (FR)

( * ) Notice: Subject to any disclaimer, the term of this patent is extended or adjusted under 35 U.S.C. 154(b) by 455 days.

(21) Appl. No.: 09/597,071

(22) Filed: Jun. 20, 2000

(30) Foreign Application Priority Data

Jun. 21, 1999 (FR) .......................................... 99 07841

(51) Int. Cl.$^7$ .............................................. G06F 12/10
(52) U.S. Cl. ...................................................... 711/207
(58) Field of Search .............................. 711/133, 134, 711/136, 207

(56) References Cited

U.S. PATENT DOCUMENTS

| | | | |
|---|---|---|---|
| 4,279,014 A | | 7/1981 | Cassonnet et al. .......... 364/200 |
| 5,329,627 A | * | 7/1994 | Nanda et al. ................ 395/400 |
| 5,802,568 A | * | 9/1998 | Csoppenszky .............. 711/136 |

FOREIGN PATENT DOCUMENTS

| | | |
|---|---|---|
| EP | 0394115 | 10/1990 |
| EP | 0788053 | 8/1997 |
| FR | 2774788 | 8/1999 |
| WO | 9418625 | 8/1994 |

* cited by examiner

*Primary Examiner*—Kevin L. Ellis
(74) *Attorney, Agent, or Firm*—Nils H. Ljungman & Associates

(57) ABSTRACT

In a computer system with a virtual addressing mechanism, a process for the de-allocation of physical pages sets, by means of a first pointer (ptr) on a line (5) of a conversion table (1) that contains an indicator (Ref) that has been set to a first state ("referenced") by a processor (2), the indicator (Ref) to a second state ("non-referenced") if the state is ("referenced") and de-allocates the line (5) if the state is ("non-referenced"). The de-allocation process claimed by the invention sets an indicator (ref) which has been set to the first state ("referenced") by the processor (2) on a line (13) of the conversion table (1) to a second state ("non-referenced") if the state is ("referenced") by means of a second pointer (ptr+Δ) on the line (13) upon the indication of an attribute value (Co) for said line (13). The de-allocation process can therefore be used for a cache mechanism.

18 Claims, 7 Drawing Sheets

PHYSICAL PAGES DE-ALLOCATION METHOD FOR VIRTUAL ADDRESSING MACHINE

The field of the invention is that of computer systems, in which an operating system includes a virtual addressing mechanism, and in particular the field of physical page de-allocation processes within the operating system, to bring them into correspondence with the virtual pages used by application processes.

The prior art discloses virtual addressing mechanisms, for example the patents or patent applications U.S. Pat. No. 4279014 and FR 9801701. A virtual addressing mechanism makes it possible to make available to one or more processors of a computer a virtual memory space that is not limited by the size of the physical memory of the machine. Corresponding to a virtual page of the virtual memory space used by the machine is a physical page of the physical memory of the machine, and the numbers of corresponding pages are stored in a correspondence table. When a processor needs to use a virtual page for which there does not exist a physical page available in memory, the operating system initiates a process to de-allocate physical pages.

Various de-allocation processes are disclosed in the prior art, such as, for example, the LRU (Least Recently Used) methods, which de-allocate the physical pages that have been least recently used. This type of process is described in EP 0394115, for example.

In the prior art, to use a process of the LRU type, each line of the conversion table includes a reference indicator. When a processor accesses a virtual page number for which there exists a line of the conversion table that contains a physical page number, the processor sets the reference indicator of this line to a first state to indicate that it has just accessed this line. When it is necessary to de-allocate physical page numbers to place them in correspondence with new virtual page numbers, the de-allocation process runs through the conversion table cyclically until it finds a reference indicator that has been placed in a second state. On each line for which the de-allocation process has detected a reference indicator that has been set to the first state, the process sets it to the second state to indicate that it has just scanned this line. Therefore, when the process again scans the reference indicator of a line, the reference indicator will still be in the second state unless any processor has reset it to the first state in the meantime. The indicators that remain in the second state are the indicators of the lines that have been used less recently than those for which the reference indicator has been reset to the first state between two successive scans of this line by the de-allocation process. The reference indicator thus establishes an aging of the utilization of the line that contains it as a function of the cycle time it takes the de-allocation process to run through the conversion table, without the ability to accelerate a preferential aging of certain lines that contain page numbers to be de-allocated more rapidly than others.

This requirement may come up, for example, if it is necessary to limit the consumption of physical pages by a process by de-allocating on a priority basis the pages that have been allocated to said process. The problem that occurs is being able to give priority to the de-allocation of certain pages without thereby de-allocating the recently used pages.

The object of the invention is a process to deallocate physical pages for a virtual addressing mechanism by means of a first pointer on a first line of a conversion table that contains an indicator that has been set to a first state by a processor, whereby said process sets the indicator to a second state if the state is the first state and de-allocating said first line if the state is the second state. The process is characterized by the fact that it sets the indicator that has been set to the first state by the processor on a second line of the conversion table to the second state by means of a second pointer on the second line on the indication of an attribute value for said second line.

The following detailed description of one exemplary embodiment of the invention refers to the accompanying figures, in which.

Figure 1:
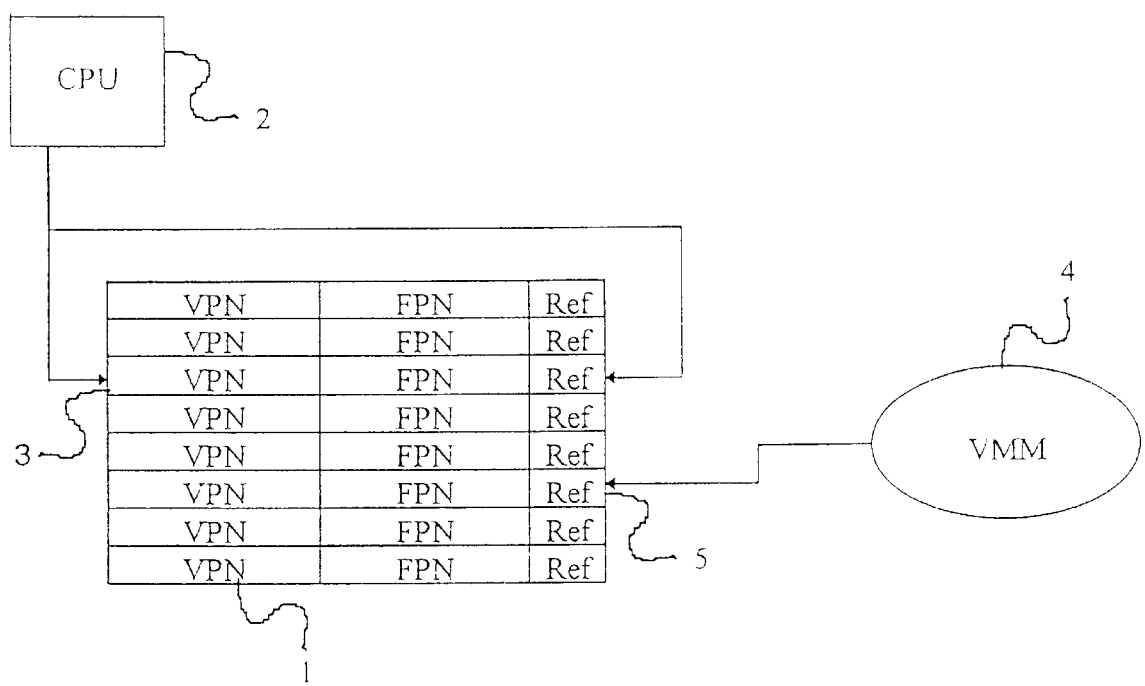
FIG. 1 represents a conversion table between virtual page numbers and physical page numbers.

The purpose of the description with reference to FIG. 1 is not to describe the virtual memory mechanisms of the prior art in detail, but simply to summarize the characteristic principles for a thorough understanding of the remainder of this text. A conversion table 1 comprises three fields. The first field is designed to contain a virtual page number VPN. A second field is designed to contain a physical page number FPN. A third field is designed to contain a reference indicator Ref. In a virtual memory mechanism, a distinction is made between accesses to and processing of the table 1, which relate to hardware on the one hand and software on the other hand.

With regard to the hardware portion, a CPU-type processor 2 has read or write access to a virtual address by means of a virtual page number. In a multiprocessor architecture, "the processor" means "one of the processors". The processor 2 looks in the table 1 for a line 3 that contains the virtual page number VPN. If this line exists, it contains a FPN which allows the processor 2 to have real access to the physical memory of the machine. The processor 2 then sets the indicator Ref of the line 3 to the "referenced" state to indicate that it has just accessed the physical page numbered FPN. As explained below, the indicator Ref is used to distinguish the most recently used pages from the least recently used pages. If this line does not exist, a page fault is generated, which calls up a virtual memory manager VMM 4.

With regard to the software portion, the manager 4 modifies the contents of the table 1 to make a page numbered FPN correspond to the page number VPN to resolve the page fault. If there is at least one free line in the table 1, i.e. a line for which a page number VPN does not correspond to a page number FPN, the manager 4 writes the virtual page number VPN in a first field of this line so that it corresponds to a physical page number FPN. If there is no free line in the table 1, the manager 4 runs through the table 1 by means of a pointer ptr to activate a de-allocation process on a line 5 pointed to by the pointer ptr.

Figure 2:
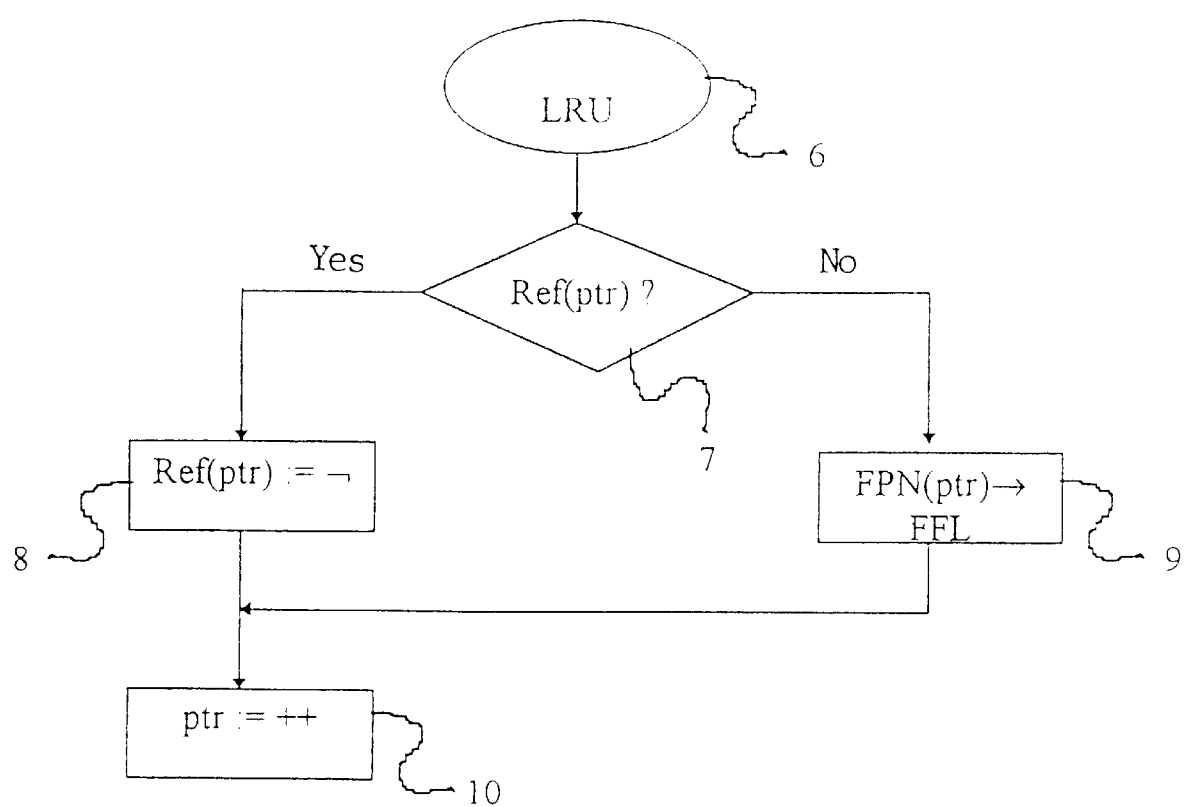
FIG. 2 represents an equiprobable page de-allocation process.

FIG. 2 is a schematic illustration of one example of a de-allocation process or the prior art known as LRU (Least Recently Used). The LRU process is so named because it de-allocates the line of table 1 that contains the number of the page among those least recently used by the processor 2.

The manager 4 activates the de-allocation process which begins at a step 6 with a pointer ptr value equal to a line number of the table 1. When the manager 4 is initialized, the value of the pointer ptr is equal to the number of the first line of the table 1. Step 6 is followed by a step 7 which reads the state of the indicator Ref contained in line 5 pointed to by ptr. A test is performed to determine whether this state is the "referenced" state.

If the response to the test is positive, it means that the processor 2 has accessed the page, the number of which is contained in line 5, before the pointer ptr arrives at this line. This page is considered recently used. A step 8 then follows step 7. In step 8, the indicator Ref is set to a "not referenced" state. A step 10 follows step 8 to increment the pointer ptr. When the pointer ptr is on the last line of the table 1, its incrementation returns it to the first line of the table 1. Thus the pointer ptr makes it possible to run through the table 1 in a cyclical fashion. When the pointer ptr once again reaches line 5, the indicator Ref will be in the "referenced" state if and only if the processor 2 has in the meantime accessed the page, the number of which is contained in line 5.

If the response to the test is negative, it means that the processor 2 has not accessed the page, the number of which is contained in line 5, before the pointer ptr arrives on this line. This page is considered not recently used. A step 9 then follows step 7. In step 9, the line 5 is de-allocated by placing the physical page number FPN in a list FFL of available pages. Step 10 follows step 9.

Thus, after the processor 2 has set the indicator Ref of the line 5 to the "referenced" state by accessing the page numbered VPN of this line, a first passage of the pointer ptr to the line 5 resets the indicator Ref to the "not referenced" state. The corresponding page numbered FPN will be de-allocated the second time the pointer ptr comes to line 5 if the processor 2 has not accessed the page numbered VPN between the first and the second passage of the pointer ptr.

Figure 3:
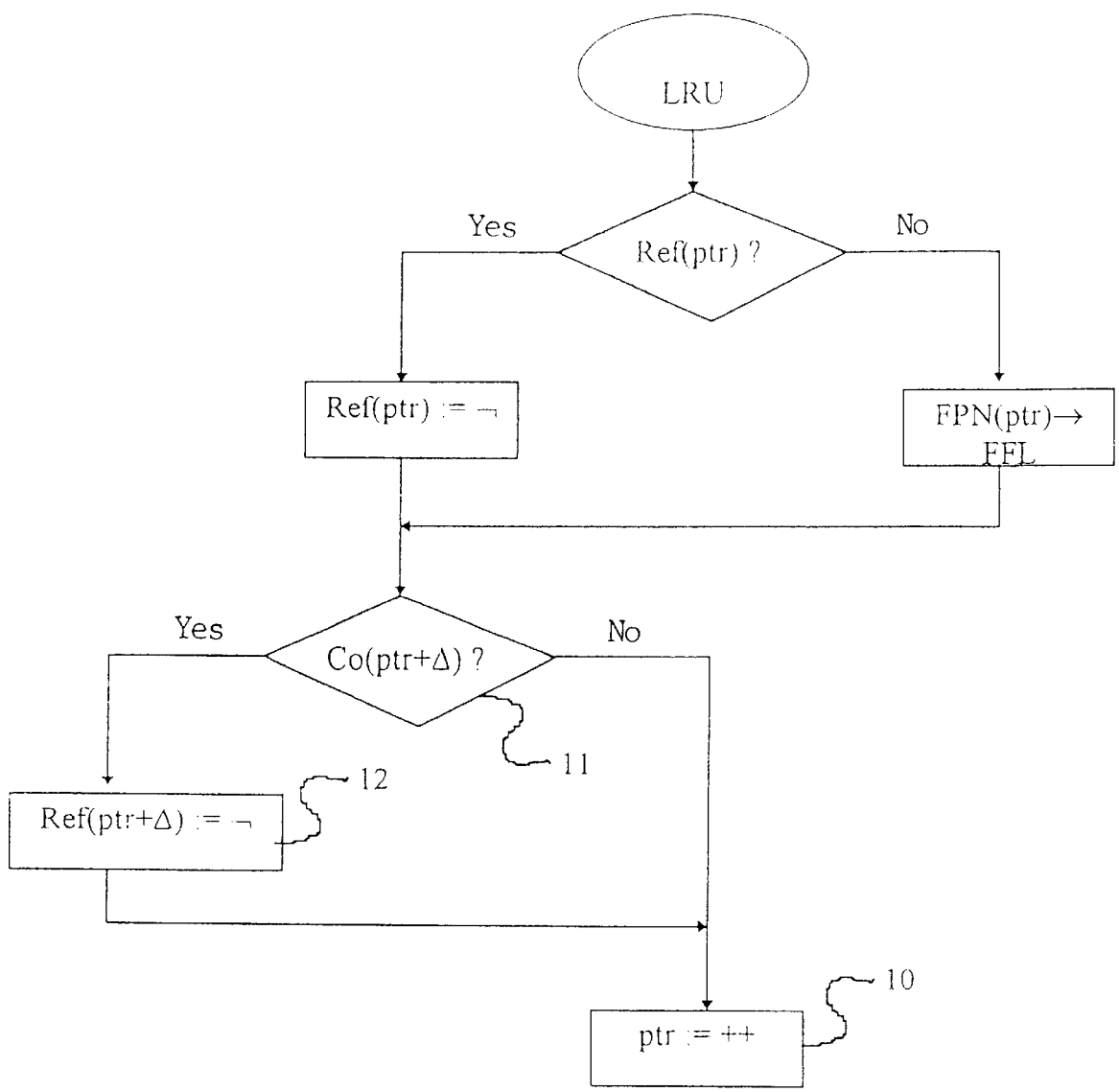
FIG. 3 represents a first differentiated probability page de-allocation process.
Figure 4:
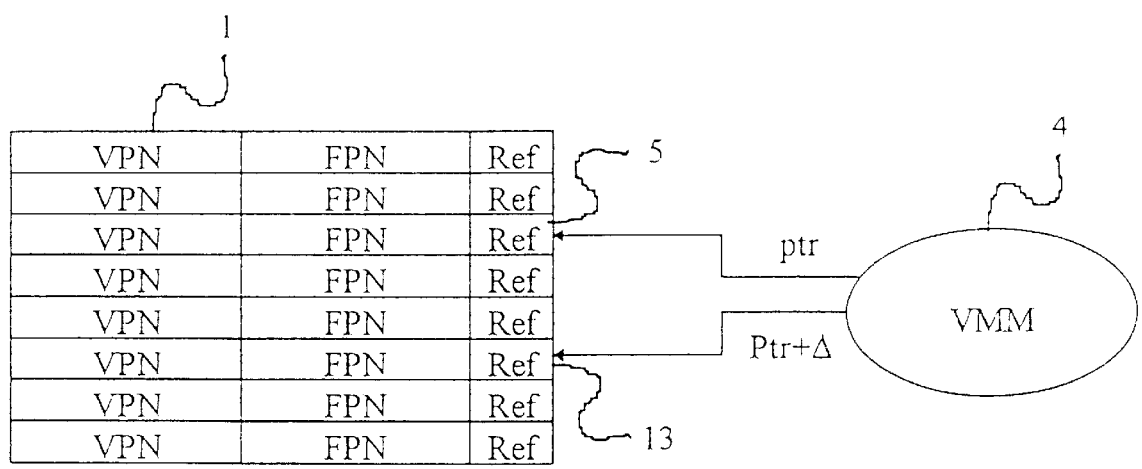
FIG. 4 represents a device to scan the table with a plurality of pointers.

In the process illustrated in FIG. 3, a second pointer ptr+$\Delta$ is used in the additional steps 11, 12. The value of the pointer ptr+$\Delta$ is equal to the value of the pointer ptr to which is added a displacement $\Delta$ which is expressed in terms of a number of lines. The pointer ptr+$\Delta$ is therefore in advance of the pointer ptr in the table 1 by several lines, e.g. on line 13 as illustrated in FIG. 4.

The computer's operating system has instructions that make it possible to assign a value called a color Co to an application process executed by the computer. The purpose of this attribute is to determine the allowable degree of persistence in table 1 of virtual page numbers VPN that belong to a segment of the application process. For example, a green color indicates the replacement of the page corresponding to a normal frequency that corresponds to one complete run-through of the table 1. An orange color indicates that the page is to be replaced at a higher frequency. These instructions trigger the execution of the process illustrated in FIG. 3.

Step 11 measures the color Co that corresponds to the page numbered VPN that is contained in line 13 and is pointed to by the pointer ptr+$\Delta$. A test is performed to determine whether the color Co indicates a reliable degree of allowable persistence. If the response is negative, step 10 follows step 11, so that the process illustrated in FIG. 3 does not, at this stage, have any additional effect with respect to the process illustrated in FIG. 2. The green color pages are replaced at the same frequency of scanning of the table 1 as indicated above.

If the response is positive, step 12 follows step 11. In step 12, the indicator Ref of line 13 is set to the "not referenced" state. The result is an accelerated aging of the utilization of the physical page numbered FPN contained in line 13 of table 1. In other words, the indicator Ref does not wait for the pointer ptr to arrive on line 13 to be forced into the "not referenced" state. To de-allocate the line 13, it is not necessary for the physical page numbered FPN to be accessed by the processor 2 in a complete scanning cycle of the table 1 by the pointer ptr. All that is necessary is for the page not to be accessed during the time taken by the pointer ptr to be incremented by a number of lines equal to $\Delta$. The probability of replacing an orange page is differentiated from the probability of replacing a green page.

It is possible to define a third color, for example a red color, with a page de-allocation probability that is even greater than for the color orange, by defining a third pointer ptr+$\Delta$+$\delta$ such that the indicator Ref of a line pointed to by ptr+$\Delta$+$\delta$ is set to the "not referenced" state if the page is red, and the indicator Ref of a line pointed to by ptr+$\Delta$ is set to the "not referenced" state if the page is red or orange.

It is possible to regulate the consumption of pages by dynamically evaluating the value of $\Delta$.

In the case of two colors, a preferred value for the displacement $\Delta$ is equal to one-half of the number of lines of table 1. This makes it possible to de-allocate the lines with the orange pages twice as fast as the lines with the green pages. For any number n of colors with a table that has N lines, we then define n pointers ptr, ptr+N/n, ptr+2N/n, ... ptr+(n−1)N/n.

Figure 5:
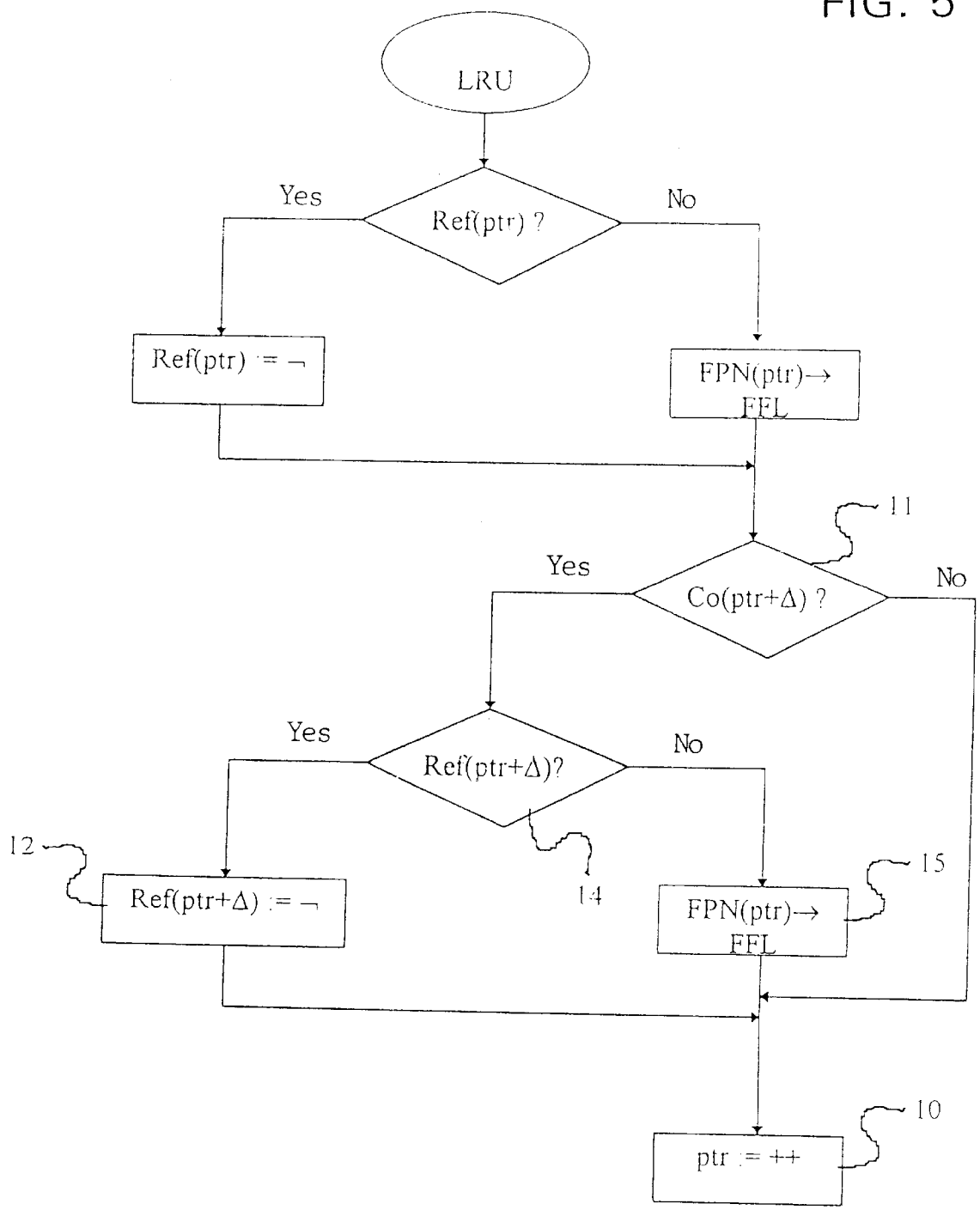
FIG. 5 represents a second differentiated probability page de-allocation process.

The process illustrated in FIG. 5 is a variant of the process illustrated in FIG. 3 which makes it possible to de-allocate the orange pages twice as fast as the green pages. If an orange page is detected in step 11, a positive response to the text explained above, a step 14 follows the step 11. The step 14 reads the state of the indicator Ref contained in line 13 pointed to by ptr+$\Delta$. A test is performed to see whether this state is the "referenced" state.

If the response to the test is positive, it means that the processor 2 has accessed the page that has the number contained in line 13 before the pointer ptr+$\Delta$ arrives on that line. This page is considered recently used. Step 12 then follows step 14. In step 14, the indicator Ref is set to a "not referenced" state. Step 10 follows step 12 to increment the pointer ptr. When the pointer ptr+$\Delta$ is on the last line of table 1, the incrementation of the pointer ptr returns the pointer ptr+$\Delta$ to the first line of the table 1. Thus the pointer ptr+$\Delta$ makes it possible to run through the table 1 in a cyclical manner. When the pointer ptr+$\Delta$ reaches line 13, the indicator Ref will be in the "referenced" state if and only if the processor 2 has accessed the page, the number of which is contained in line 13, since the last passage of the pointer ptr over this line, i.e. one-half a cycle of running through table 1.

If the response to the test is negative, it means that the processor 2 has not accessed the page that has the number contained in line 13, between the time the pointer ptr previously passed over this line and the time the pointer ptr+$\Delta$ reached this line. This page, which was marked orange in step 11, is considered not recently used. A step 15 then follows step 14. In step 15, the line 13 is de-allocated by placing the physical page number FPN in a list FFL of free pages. Step 10 follows step 15. When the value of $\Delta$ is equal to one-half the number of lines of the table 1, the orange pages are replaced at twice the probability of the green pages.

By favoring the de-allocation of certain pages, the de-allocation process described above makes it possible to control the consumption of memory by the application processes that are being executed on the computer. For this purpose, the application processes or process threads are organized into classes.

Each class is associated with a counter and three threshold values. The counter is used to measure a quantity Q of physical pages consumed by the processes and threads of the class. The first value Min indicates a minimum number of physical pages to be reserved for the class. The second value Opt indicates an optimal number of physical pages consumed by the processes or threads of the class. The third value Max indicates a maximum number of physical pages that can be used by the processes and threads of the class.

In prior-art processes for the management of virtual memory, access to the virtual page number VPN for which there does not exist a correspondence in the table 1 by the processor 2 that is executing a thread Thl generates a page fault. To resolve the page fault, the virtual memory manager 4 takes a physical page number FPN in the list of free pages FFL to bring it into correspondence with the virtual page number VPN in table 1. If the list of free pages FFL is empty, the manager 4 initiates the LRU page de-allocation process to supply the list FFL and resolve the page fault.

To use the invention, every time a page fault is resolved, the manager 4 seeks the class to which the thread Thl belongs for which the page fault was generated and marks the page number FPN that resolved the page fault with a class identifier Cid. The manager 4 increments the value Q of the class counter. Thus the value Q represents the number of physical pages consumed by the class.

Figure 6:
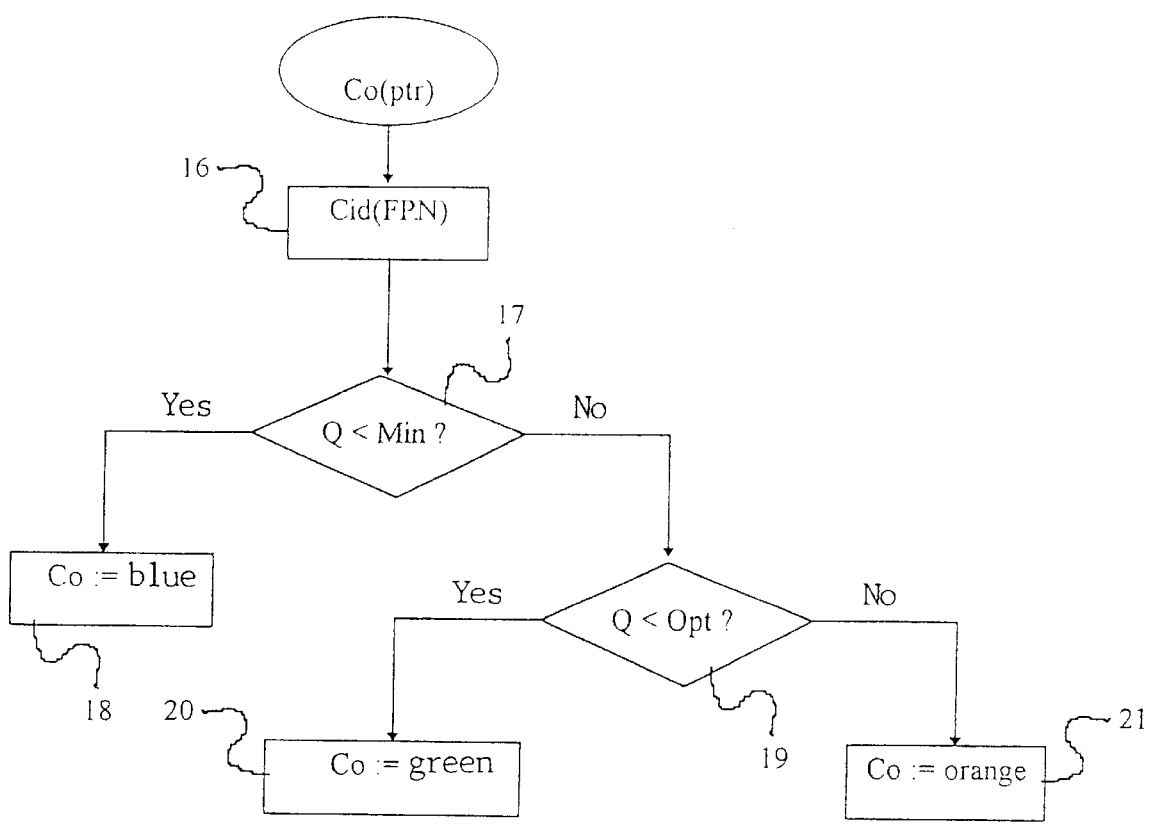
FIG. 6 represents a means to calculate a page color.

FIG. 6 illustrates a means to calculate the color of a page number FPN contained in a line of table 1 indicated by the pointer ptr, ptr+Δ. A step 16 determines the class for which the page number FPN is used by its identifier Cid.

A step 17 tests whether the quantity Q of the counter assigned to the class is less than the value Min for this class. If the response is positive, a "blue" color is indicated in step 18.

If the response is negative, a step 19 tests whether the quantity Q of the counter assigned to the class is less than the value Opt for this class. If the response is positive, the color "green" is indicated in step 20. If the response is negative, the color "orange" is indicated in step 21.

As illustrated in FIG. 6, the value of the attribute Co is obtained by means of a function that receives as parameters the consumption of physical pages by the class identifier Cid which is given by the quantity Q of the counter. The discrete values "blue", "green" and "orange" can be replaced by numerical values so that the function evolves continuously as a polynomial function of a ratio between the quantity used and the total quantity of memory. Corresponding to a value series VSi of this function is a series of pointers $ptr_i$ such that the reference indicator Ref of the line pointed to by the pointer $ptr_i$ is placed in the second "non-referenced" state for any value of the function that is greater than the value VSi.

For example, the pointer $ptr_1$ sets the indicator Ref to the "non-referenced" state when the value of Q exceeds VS1. The pointers $ptr_1$ and $ptr_2$ set the indicator Ref to the "non-referenced" state when the value of Q exceeds VS2, which is greater than VS1. The pointers $ptr_1$ and $ptr_2$ and two pointers $ptr_3$ set the indicator Ref to the "non-referenced" state when the value Q exceeds VS3, which is greater than VS2. It will be noted that when there are a plurality of values VSi, it is possible to accelerate an aging of pages as the consumption increases, which makes it possible to avoid reaching an authorized maximum.

Figure 7:
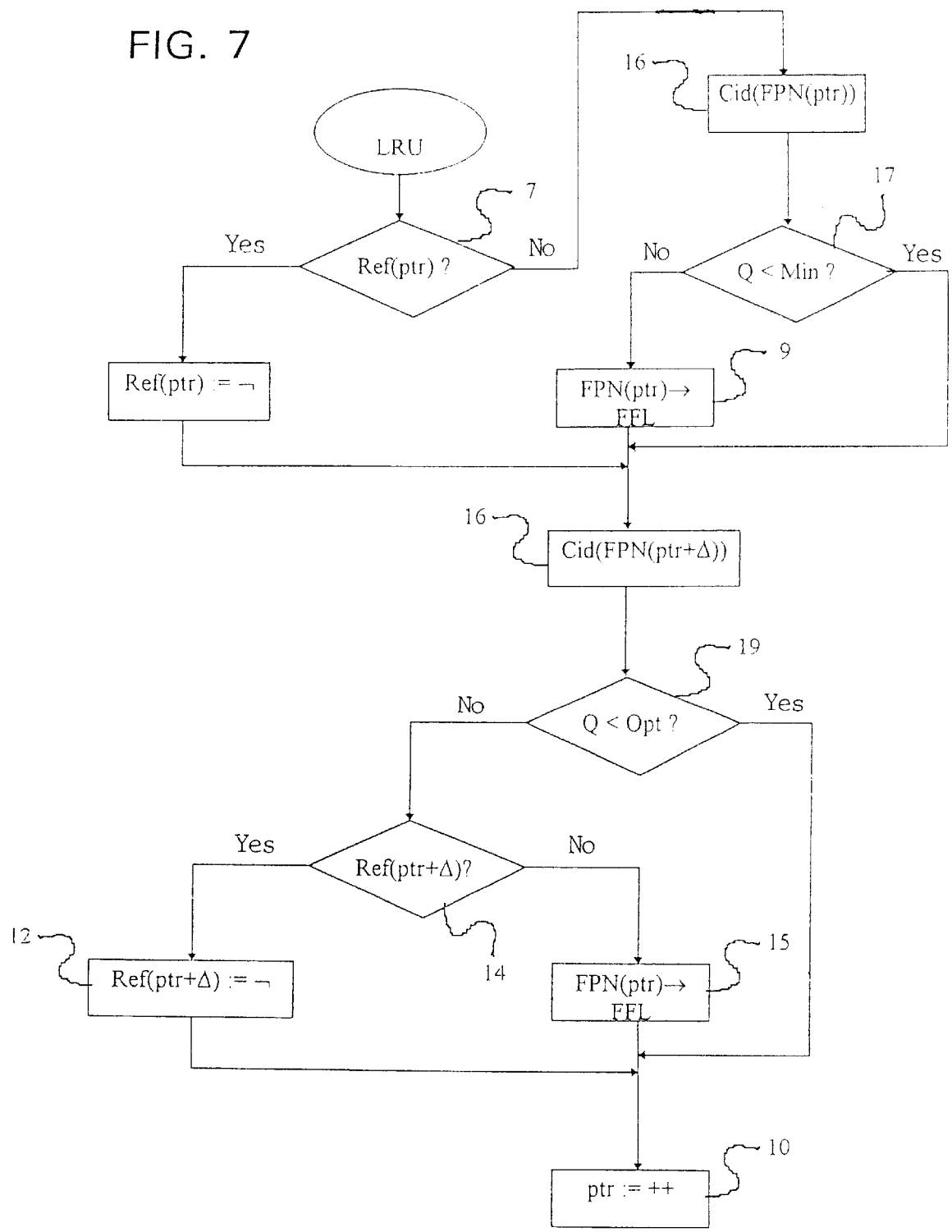
FIG. 7 represents a page de-allocation process to control the memory used by the application processes.

With reference to FIG. 7, the steps in FIG. 6 are executed as needed in the page de-allocation process as described with reference to FIG. 5.

When the pointer ptr points to the line 5 of table 1, the step 16 is activated to determine via its identifier Cid the class for which the page numbered FPN on line 5 is used. Following step 16, the step 17 tests whether the quantity Q of the counter attributed to the class is less than the value Min for this class. If the response is negative, the page number FPN on line 5 is placed in the list FFL of free pages when the reference indicator Ref(ptr) is in the second state. Thus the line 5 is de-allocated if it is not blue.

If the response is positive, the step 9 is not executed. Thus, as long as the color for a class is blue, the pages used by this class are not de-allocated. This method ensures a minimum number of pages reserved for the class.

When the pointer ptr+Δ points to line 13 of table 1, the step 16 is activated to determine, by its identifier Cid, the class for which the page numbered FPN on line 13 is being used. Following step 16, the step 19 then tests whether the quantity Q of the counter assigned to the class is less than the value Opt for this class. If the response is negative, the page number FPN of line 13 is placed in the list FFL of free pages when the reference indicator Ref(ptr+Δ) is in the second state. Thus line 13 is de-allocated if it is not green or blue.

If the response is positive, step 15 is not executed. Thus, as long as the color for a class is green, the pages used by this class are not de-allocated by the scanning of the pointer ptr+Δ. The green pages can be de-allocated only by the pointer ptr. The orange pages can be deallocated by the pointer ptr and by the pointer ptr+Δ, and they therefore have a tendency to be de-allocated twice as quickly as the green pages.

When a sufficient number of pages in one class in the color orange have been de-allocated, the value Q of the counter of this class naturally falls below the value Opt which brings the class into the color green. The page de-allocation process claimed by the invention makes it possible to control the consumption of pages of one process glass or threads to keep it within two values Min and Opt determined for this class.

To prevent the number of pages being used by a class from reaching the value Max, it is possible to define one or more additional colors, for example red with the additional pointers to table 1 as explained above. To avoid exceeding the value Max, the recommended method is to then put the processes and threads of this class to sleep until returning to an orange or even green color. Another page de-allocation process which is independent of the page faults is then initiated to put the applications processes to sleep. This other page de-allocation process runs through the table 1 to systematically de-allocate all the red pages detected until the class is no longer in the color red, following which the processes and threads that are asleep are awakened.

The teaching of the invention is not limited to the particular implementation described above. It is also advantageous to use the invention in a cache mechanism. A cache mechanism is a mechanism of the prior art that makes it possible to temporarily store data from a low-speed access memory in a high-speed access memory to allow a processor or a group of processors to access these data more rapidly. The high-speed access memory is constituted by a limited number of lines to contain the data from the low-speed access memory that are temporarily used by the processor or processors. A line de-allocation mechanism makes it possible to load new data into the high-speed access memory.

Using a certain analogy between the virtual addressing mechanisms and the cache mechanisms, a line 5 of the conversion table 1 can be considered similar to a line of high-speed memory. In a virtual addressing mechanism, the physical memory acts as a fast access memory, compared to the virtual memory which sometimes needs to repatriate pagees from mass storage elements which have relatively low-speed access.

By means of a first pointer ptr on a line 5 of high-speed access memory containing an indicator Ref set to a first "referenced" state by a processor 2, the de-allocation process for the cache mechanism sets the indicator Ref to a second "non-referenced" state if the state is "referenced" and de-allocates line 5 if the state is "non-referenced". The process sets an indicator Ref, which has been set to the first "referenced" state by the processor 2 on a line 13 of said high-speed access memory, to a second "non-referenced" state if the state is "referenced" by means of a second pointer ptr+$\Delta$ on line 13 when an attribute value Co is indicated for said line 13.

For example, the process is executed by means of instructions wired into the cache memory for each high-speed access memory. The color attribute is determined, for example, as a function of a data type such that the color of the segment to which these data belong or for which the parameters can be set by means of registers made available especially by logic layers.

What is claimed is:

1. A physical page de-allocation process for a virtual addressing mechanism comprising:

a conversion table having a plurality of lines of data, the lines containing virtual to physical address mappings, an indicator, and an attribute, the indicator indicating if the line is in a referenced or non-referenced state, the indicator being set to the referenced state by a processor when the line is accessed, a first pointer which points to a first line of the conversion table, said de-allocation process examining the first line pointed to by the first pointer and either sets the indicator to the non-referenced state if the indicator is in the referenced state or de-allocating the line if the indicator is in the non-referenced state, a second pointer which points to a second line of the conversion table, the second line being n lines away from the first line (n being an integer greater than zero), said de-allocation process examining the second line pointed to by the second pointer and based upon the attribute of the second line, setting the indicator to the non-referenced state if the indicator is in the referenced state.

2. A line de-allocation process for a cache mechanism comprising:

a high-speed access memory having a plurality of lines of data, the lines containing virtual to physical address mappings, an indicator, and an attribute, the indicator indicating if the line is in a referenced or non-referenced state, the indicator being set to the referenced state by a processor when the line is accessed, a first pointer which points to a first line of the high-speed access memory, said de-allocation process examining the first line pointed to by the first pointer and either sets the indicator to the non-referenced state if the indicator is in the referenced state or de-allocating the line if the indicator is in the non-referenced state, a second pointer which points to a second line of the high-speed access memory, the second line being n lines away from the first line (n being an integer greater than zero), said de-allocation process examining the second line pointed to by the second pointer and based upon the attribute of the second line, setting the indicator to the non-referenced state if the indicator is in the referenced state.

3. The process as claimed by claim 1, comprising:

de-allocating the second line if the state of the indicator is non-referenced by means of the second pointer on the second line based upon the attribute for the second line.

4. The process as claimed in claim 1, wherein:

the second pointer on the second line is defined by a displacement of the first pointer by a number of lines equal to one-half the number of lines of the conversion table.

5. The process as claimed in claim 1, wherein:

the attribute is obtained by a function that has as parameters the consumption of physical pages by a class of application processes.

6. The process as claimed in claim 5, wherein:

the function evolves in a discrete manner when the consumption is greater than an optimum quantity of physical pages that can be used by the processes and threads of the class.

7. The process as claimed in claim 5, wherein:

the function evolves continuously and a series of values (Vsi) of this function corresponds to a series of pointers (ptr$_i$) such that the indicator of the line pointed to by the pointer (ptr$_i$) is set to the non-referenced state for any value of the function that is greater than the value (Vsi).

8. A physical page de-allocation process for a virtual addressing mechanism comprising:

a conversion table having a plurality of lines of data, the lines containing virtual to physical address mappings, an indicator, and a first attribute, the indicator indicating if the line is in a referenced or non-referenced state, the indicator being set to the referenced state by a processor when the line is accessed, a first pointer which points to a first line of the conversion table, said de-allocation process examining the first line pointed to by the first pointer and either sets the indicator to the non-referenced state if the indicator is in the referenced state or de-allocating the line if the indicator is in the non-referenced state, a second pointer which points to a second line of the conversion table, the second line being n lines away from the first line (n being an integer greater than zero), said de-allocation process examining the second line pointed to by the second pointer and based upon a second attribute of the second line, setting the indicator to the non-referenced state if the indicator is in the referenced state.

9. The process as claimed by claim 8, comprising:

de-allocating the second line if the state of the indicator is non-referenced by means of the second pointer on the second line based upon the second attribute for the second line.

10. The process as claimed in claim 8, wherein:

the second pointer on the second line is defined by a displacement of the first pointer by a number of lines equal to one-half the number of lines of the conversion table.

11. The process as claimed in claim 8, wherein:

the first attribute value represents a consumption of physical pages by a class of applications processes greater than a minimum quantity of physical pages, and the second attribute value represents a consumption of physical pages by a class of applications processes greater than an optimum quantity of physical pages that can be used by the processes and threads of the class.

12. The process as claimed in claim 2, comprising:

de-allocating the second line if the state of the indicator is non-referenced by means of the second pointer on the second line based upon the attribute for the second line.

13. The process as claimed in claim 2, wherein:

the second pointer on the second line is defined by a displacement of the first pointer by a number of lines equal to one-half the number of lines of the high-speed access memory.

14. The process as claimed in claim 2, wherein:

the attribute is obtained by a function that has as parameters the consumption of physical pages by a class of application processes.

15. The process as claimed in claim 14, wherein:

the function evolves in a discrete manner when the consumption is greater than an optimum quantity of physical pages that can be used by the processes and threads of the class.

16. The process as claimed in claim 14, wherein:

the function evolves continuously and a series of values (Vsi) of this function corresponds to a series of pointers ($ptr_i$) such that the reference indicator of the line pointed to by the pointer ($ptr_i$) is set to the non-referenced state for any value of the function that is greater than the value (Vsi).

17. The process as claimed in claim 9, wherein:

the second pointer on the second line is defined by a displacement of the first pointer by a number of lines equal to one-half the number of lines of the conversion table.

18. The process as claimed in claim 9, wherein:

the first attribute value represents a consumption of physical pages by a class of applications processes greater than a minimum quantity of physical pages, and the second attribute value represents a consumption of physical pages by a class of applications processes greater than an optimum quantity of physical pages that can be used by the processes and threads of the class.

* * * * *